(12) United States Patent
Kimmel

(10) Patent No.: US 7,756,323 B2
(45) Date of Patent: Jul. 13, 2010

(54) THREE-DIMENSIONAL VIDEO SCANNER

(75) Inventor: Ron Kimmel, Haifa (IL)

(73) Assignee: Technion Research & Development Foundation Ltd., Haifa (IL)

( * ) Notice: Subject to any disclaimer, the term of this patent is extended or adjusted under 35 U.S.C. 154(b) by 945 days.

(21) Appl. No.: 10/586,046

(22) PCT Filed: Jan. 16, 2005

(86) PCT No.: PCT/IL2005/000057

§ 371 (c)(1),
(2), (4) Date: Jul. 14, 2006

(87) PCT Pub. No.: WO2005/067389

PCT Pub. Date: Jul. 28, 2005

(65) Prior Publication Data

US 2007/0165246 A1   Jul. 19, 2007

Related U.S. Application Data

(60) Provisional application No. 60/536,525, filed on Jan. 15, 2004.

(51) Int. Cl.
G01B 11/34 (2006.01)
G02B 5/32 (2006.01)
H01J 3/14 (2006.01)
G01N 21/86 (2006.01)

(52) U.S. Cl. .................. 382/154; 356/608; 359/17; 250/236; 250/559.38

(58) Field of Classification Search ............... 382/154, 382/286, 293, 268, 151, 199, 141, 203, 206, 382/207, 210, 291, 149; 356/376, 374, 375, 356/4.09, 610, 608; 250/559.36, 236, 208.1, 250/205, 201.6, 237 G, 559.38; 359/17
See application file for complete search history.

(56) References Cited

U.S. PATENT DOCUMENTS 6,128,077 A    10/2000  Jovin et al.
6,438,272 B1 *  8/2002  Huang et al. ............... 382/286
6,493,095 B1   12/2002  Song et al.
7,545,516 B2 *  6/2009  Jia et al. ................... 356/603

FOREIGN PATENT DOCUMENTS

DE    19608632    9/1997

* cited by examiner

Primary Examiner—Sheela C Chawan
(74) Attorney, Agent, or Firm—Browdy and Neimark, PLLC

(57) ABSTRACT

A 3D scanning device comprises: a digital light encoding unit comprising a digital micromirror device for encoding a rapidly changing shape signal onto a light beam directed to an object, a shape of said signal being selected such that distortions thereof by a contoured object reveal three-dimensional information of said contour; a detector synchronized with said digital light processing unit for detecting reflections of said light beam from said object, and a decoder for determining a 3D shape of said object from distortions of said signal in said detected reflections.

17 Claims, 4 Drawing Sheets

DLP projector + Firewire (IEEE 1394) PT gray camera

THREE-DIMENSIONAL VIDEO SCANNER

RELATED APPLICATIONS

This application is a National Phase Application of PCT Patent Application No. PCT/IL2005/000057 having International Filing Date of Jan. 16, 2005, which claims the benefit of U.S. Provisional Patent Application No. 60/536,525 filed on Jan. 15, 2004. The contents of the above Applications are all incorporated herein by reference.

FIELD AND BACKGROUND OF THE INVENTION

The present invention relates to a method and apparatus for three dimensional video sampling or scanning and, more particularly, but not exclusively to a method or apparatus for obtaining scanning data in real time.

There are many ways to scan the 3D shape of objects, and some of these methods have been in use for many years. One such method is to obtain shape information from shading, but this requires prior knowledge of how the object is lit. A method that has been in use for many years is shape from stereo, which involves using two cameras to photograph an object. A further method is to obtain the shape from photometric stereo. Photometric stereo uses successive images taken from the same camera position but under different lighting conditions.

A further technique is illustrated in appended FIGS. 1a) and 1b) and obtains shape from structured light. Briefly the technique involves constructing a surface model of an object based on projecting a sequence of well defined light patterns onto the object. For every pattern an image of the scene or object is taken. This image, together with the knowledge about the pattern and its relative position to the camera are used to calculate the coordinates of points belonging to the surface of the object.

There are several variants of the Shape from Structured Light technique. That illustrated in FIG. 1 involves projecting a plane onto an object 10 using laser light 12 (FIG. 1a). The image of such a scene is controlled to contain only the line 12 which represents the intersection of the object and the laser plane. Such an image is shown in FIG. 1b).

In order to reconstruct the entire object 10 the laser plane has to be projected onto different parts of the object, and this may be achieved by either moving the laser or moving the object. In one approach, multiple views of the object are obtained by rotating the object on the turntable. It is clear that the approach is not suitable for real time operation.

Another approach currently being used is known as shape from coded light. Referring now to FIG. 2, and the system involves projecting rapidly changing patterns from a projector 14 onto the object and then noting which patterns arrive at which pixels in a detecting camera 16. Pixels at which earlier projected patterns arrive can be assumed to be located deeper than pixels at which later projected patterns arrive. A processor unit 17 carries out the depth pattern decoding, allowing output 18 to display an image with 3D information.

An example of this approach is found in Song Zhang and Peisen Huang, High Resolution Real Time 3D Shape Resolution, New York State University, The paper describes a high-resolution, real-time 3D shape acquisition system based on structured light techniques. The system described uses a color pattern whose RGB channels are coded with either sinusoidal or trapezoidal fringe patterns. Again with reference to FIG. 2, when projected by a modified DLP projector, 14, with color filters removed, the color pattern results in three grayscale patterns projected sequentially at a frequency of 240 Hz. A high-speed black and white CCD camera 16 synchronized with the projector captures the three images, from which the 3D shape of the object is reconstructed. A color CCD camera (not shown) may also be used to capture images for texture mapping.

The maximum 3D shape acquisition speed is 120 Hz (532'500 pixels), which is high enough for capturing the 3D shapes of moving objects. Two coding methods, sinusoidal phase-shifting, and trapezoidal phase-shifting, were tested. The trapezoidal phase-shifting algorithm is reported to make real-time 3D reconstruction possible.

The above-described technique is experimental, however, laser scanners that can be found in some commercial products can be classified as part of the structured light technique.

In order to obtain real time 3D sensing, several new techniques have been recently developed. In addition to the trapezoidal phase shifting referred to above, the 3D structure of an object can be computed from the optical recorded deformation of a single known pattern. However, texture within the object may cause matching problems and significant inaccuracies.

Another interesting idea is that of 3DV-systems. There system involves flooding a target with rapid pulses of light. The pulses are reflected from the target in such a way that reflections arrive first from parts of the target closest to the camera. Reflections from more distant parts arrive later. The system is based on measuring the travel time of a pulse of light. The 3DV-systems products require very high precision and are thus very expensive. Furthermore they are sensitive to textures, albeit less so than with coded light.

There is thus a widely recognized need for, and it would be highly advantageous to have, a 3D scanning system devoid of the above limitations.

SUMMARY OF THE INVENTION

According to one aspect of the present invention there is provided a 3D scanning device comprising:

a digital light encoding unit comprising a digital micromirror device for encoding a succession of structural light signals onto a light beam directed to an object, a structure of the signal being selected such that distortions thereof by a contoured object reveal three-dimensional information of the contour;

a detector synchronized with the digital light processing unit for detecting reflections of the light beam from the object, and a decoder for determining a 3D shape of the object from distortions of the signal in the detected reflections.

Preferably, the rapidly changing time signal comprises binary pattern elements.

Preferably, the detector comprises a plurality of pixels, and each pixel is configured to output a binary signal indicating the detecting reflections.

Preferably, the rapidly changing time signal defines a sequence of time frames.

Preferably, the detector comprises a plurality of pixels, and each pixel is configured to output a single bit per time frame indicating the detecting reflections.

The system further comprises a preprocessor for thresholding and encoding data received at pixels of the detector thereby to recover the binary data.

According to a second aspect of the present invention there is provided a method of real time three-dimensional scanning of an object, comprising:

directing a light beam at the object via a digital micromirror device;

operating the digital micromirror device to modulate a rapidly changing structural light signal onto the beam;

detecting a reflection of the beam at a detector synchronized with the beam; and decoding the reflection to determine depth information of the object.

Preferably, the rapidly changing structural light signal comprises a binary pattern element.

Preferably, the detector comprises a plurality of sensing pixels, and each pixel sends a binary signal for the decoding.

Preferably, the rapidly changing structural light signal defines time frames, wherein the detector comprises a plurality of sensing pixels and each pixel sends a single bit per time frame for the decoding.

According to a third aspect of the present invention there is provided a 3D scanning device comprising:

a beam source for producing a light beam for projection towards an object;

a digital light binary signal encoding unit connected downstream of the beam source, for modulating a rapidly changing structural light signal onto the light beam, the signal comprising a structure selected for distortion by a three-dimensional contour, a detector comprising sensor pixels, synchronized with the digital light binary signal encoding unit, for detecting reflections of the light beam from the object at the sensing pixels as binary data, and a binary decoder for determining a 3D shape of the object from distortions of the time signal in the detected reflections.

The system may comprise a preprocessor associated with the detector for thresholding and encoding data of the detected reflections at the sensing pixels, thereby to recover the binary data.

Preferably, the digital light binary signal encoding unit comprises a digital micromirror device to modulate the binary data onto the signal.

According to a fourth aspect of the present invention there is provided a method of real time three-dimensional scanning of an object, comprising:

directing a light beam at the object;

modulating a rapidly changing shape signal onto the beam, the signal comprising a shape selected such that distortion thereof is indicative of a three-dimensional contour of the object;

synchronously detecting a reflection of the beam at a detector synchronized with the modulating of the beam; and decoding the reflection to extract distortion information of the modulated binary time signal, therefrom to determine information of the three-dimensional contour of the object.

According to a fifth aspect of the present invention there is provided a method of real time three-dimensional scanning of an object, comprising:

directing a light beam at the object, modulating a light frame and a dark frame onto the light beam in successive frames prior to reaching the object, detecting reflections from the object of the successive frames at a detector to obtain a light frame detection level and a dark frame detection level, calculating a mid level between the light frame detection level and the dark frame detection level, setting the mid level as a detection threshold at the detector, modulating a plurality of structural light signals onto the beam in further successive frames, detecting the successive frames at the detector using the detection threshold, thereby to provide binary detection of the structured light signal, and determining a three-dimensional structure of the object from detected distortions in the structured light signals.

Preferably, the detecting is synchronized with the modulating.

Preferably, the modulating is carried out using a digital micromirror device.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figures 1A, 1B:
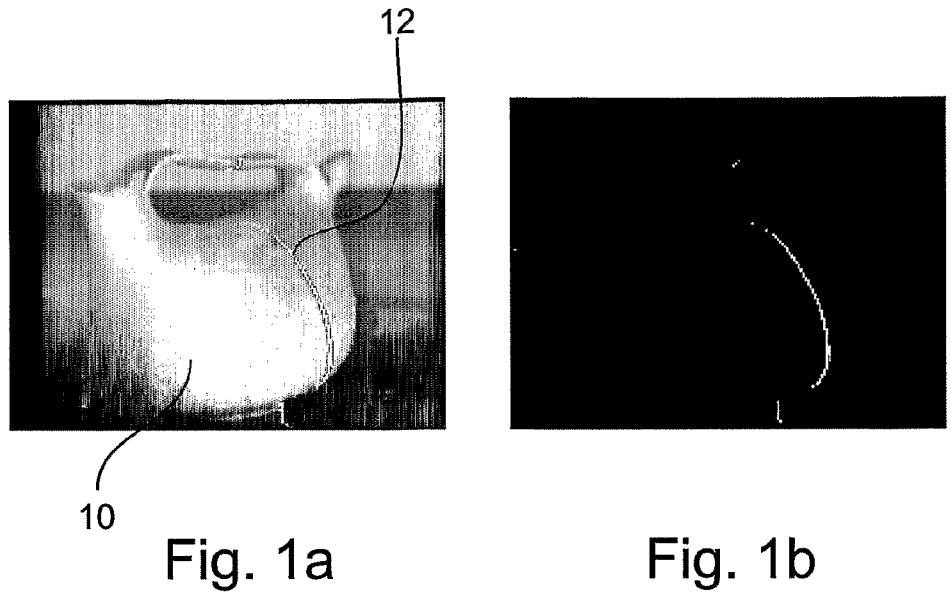
FIGS. 1a and 1b are images showing the principle according to the prior art of using structured light for revealing the contour of a three-dimensional object.
Figure 2:
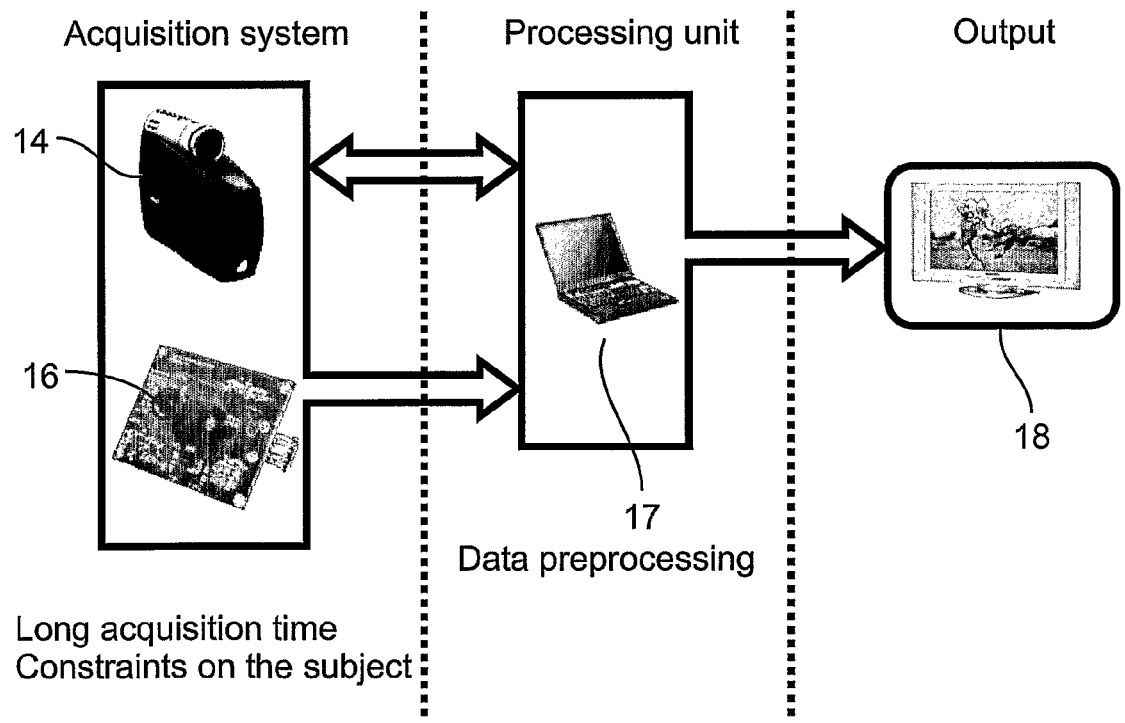
FIG. 2 is a schematic view of an earlier three-dimensional scanner designed by the present inventor.

The present embodiments comprise an improved solution that comes under the structured light heading described above. The solution is based on a recent nano-technology development in the projection field that allows the classical coded light technique to work in real time, together with a modification of existing CMOS sensing technology. The idea is to use the nano-technology to project a sequence of binary patterns efficiently at very high frame rate onto an object whose three-dimensional contour information is required. The pattern strikes the object and is distorted. Subsequently the distorted binary pattern sequence arriving at the imaging sensor is detected at each pixel thereof. The disparity between the sent and received pixels may then be computed to yield the 3D shape of the object. In order to achieve real time processing, the sensor does not attempt to transmit all of the information received at each pixel. Rather, since the original coded image comprises binary patterns, and since the 3D depth information of the object is available as binary information for each time instant per pixel, only binary information (1 bit rather than greyscale) per pixel needs to be passed from the sensor for analysis.

The principles and operation of a 3D scanner according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 3:
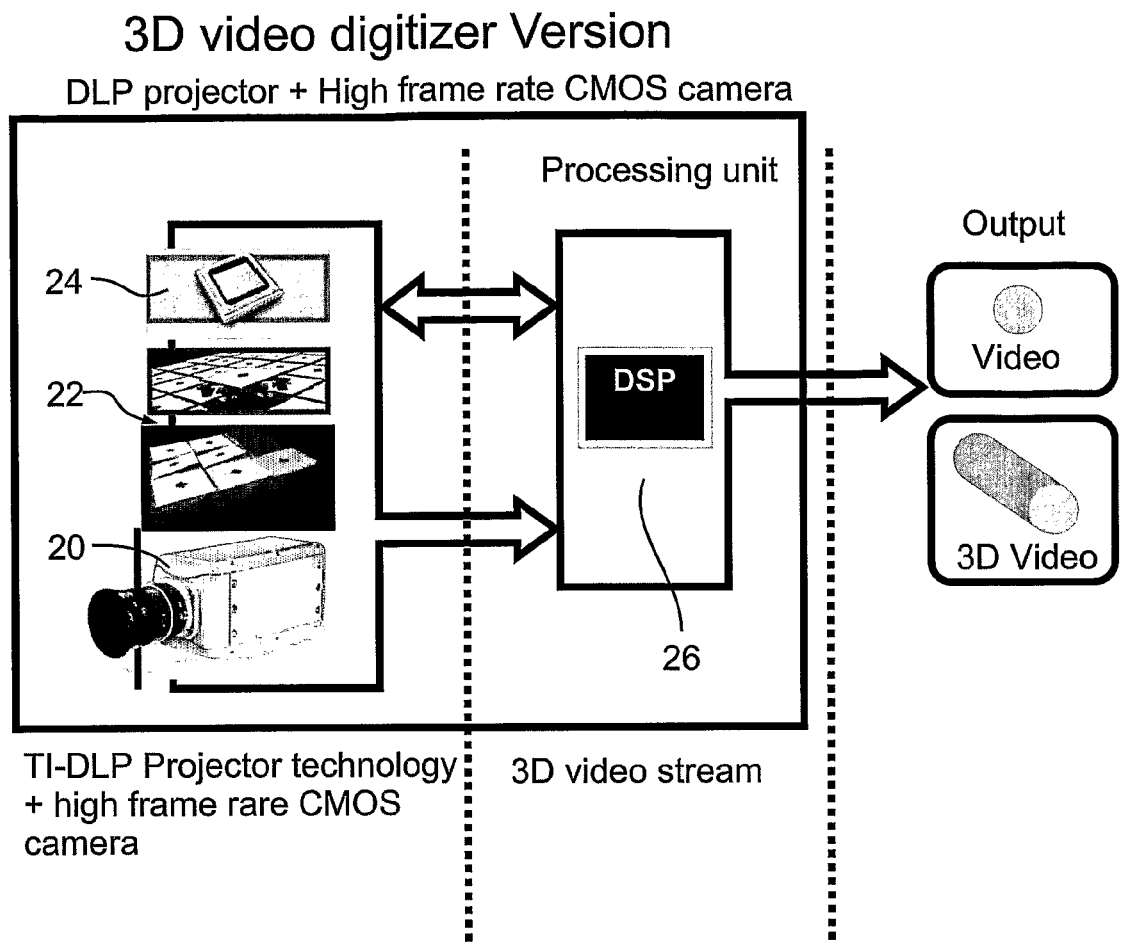
FIG. 3 is a schematic view of a first preferred embodiment of the present invention, in which a digital micromirror device is used to modulate a structural light signal onto the projected beam, but in which the detector is not synchronized with the modulator.

Reference is now made to FIG. 3, which illustrates a first preferred embodiment of the present invention. In FIG. 3, a T1 DLP (Digital light processing) projector 20 projects a light beam that has been modulated by a digital micromirror device 22, typically contained within the projector. The modulation inserts information into the light beam that later allows depth information to be decoded. Specifically structural information is modulated into the light beam. A preferred embodiment uses a simple pattern of black and white stripes. The modulated beam is projected onto an object or scene and detected at high frame rate CMOS-based camera 24. The detected signal, summed from all of the pixels, is directed to processor device 26, which extracts the depth information. The depth information is extracted from the way in which the striping in the original signal has become distorted in the reflection. That is to say, contour features on the object distort the stripes. In order to recover the shape information of the object, all that is needed is to process the contours of the original shape as recovered from the object, as will be described in detail below.

Figure 4:
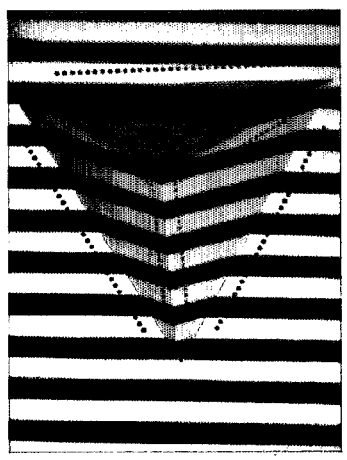
FIG. 4 shows the raw detected output when a structural light signal, in this case comprising black and white stripes, is applied to a pyramidical object.

Reference is now made to FIG. 4, which shows the raw image at the detector following projection of a beam modulated with a striped image. The object is a pyramid and the stripes are black and white. However the raw image includes shading due to lighting and or coloration and or texture on the object.

Figure 5:
FIG. 5 shows the raw detected output when detected using binary thresholded detection according to a preferred embodiment of the present invention.

Reference is now made to FIG. 5, which is a simplified diagram showing the striped image as detected by the pixels following binary thresholding as will be described hereinbelow. The binary thresholding cancels out the shading on the object and allows the individual pixels to produce a binary output, as will be described below.

Before continuing, it is appropriate to make some comments on digital light processing and the digital micromirror device. Digital Light Processing (DLP) is currently used mainly for digital projectors. DLP projectors are based on an optical semiconductor known as the Digital Micromirror Device, or DMD chip, which was invented by Dr. Larry Hornbeck of Texas Instruments in 1987. The DMD chip is a sophisticated light switch and comprises a rectangular array of up to 1.3 million hinge-mounted microscopic mirrors. Each of these micromirrors measures less than one-fifth the width of a human hair, and corresponds to one pixel in a projected image. When a DMD chip is coordinated with a digital video or graphic signal, a light source, and a projection lens, its mirrors can reflect an all-digital image onto a screen or other surface. The DMD and the sophisticated electronics that surround it are referred to as Digital Light Processing technology.

A DMD panel's micromirrors are mounted on tiny hinges that enable them to tilt either toward the light source in a DLP projection system (ON) or away from it (OFF)—creating a light or dark pixel on the projection surface.

The bit-streamed image code entering the semiconductor directs each mirror to switch on and off up to several thousand times per second. When a mirror is switched on more frequently than off, it reflects a light gray pixel. A mirror that is switched off more frequently reflects a darker gray pixel. This way, the mirrors in a DLP projection system can reflect pixels in up to 1,024 shades of gray to convert the video or graphic signal entering the DMD into a highly detailed gray-scale image.

Returning to FIG. 3 and the embodiment shown therein requires a large amount of data to be sent from each pixel for processing by processor device 26. The raw image that is received is similar to that shown in FIG. 4 and the gray levels detected by the pixels have to be interpreted in order to find out where the bright and dark stripes are. After all, a white stripe on a black surface may well be intrinsically darker than a black stripe on a white surface, depending what other illumination is around. Whilst certainly possible, the ability both to be able to carry and subsequently process such a quantity of data acts as a bottleneck in system processing speed and makes the system more expensive and complex than might be otherwise be desired.

Reference is now made to FIG. 4, which is a schematic diagram of a further preferred embodiment of the present invention. Parts that are the same as in previous figures are given the same reference numerals and are not referred to again except as necessary for understanding the present embodiment. In FIG. 4, a beam source 30 produces a beam of light for projection onto an object 32. The beam is modulated at modulator 22 with a pattern that will enable depth mapping, for example the striped pattern discussed above, and the modulated beam is projected onto the object from projector 20. Projector 20 is synchronized with camera 24 using a synchronization connection. It is noted that the use of the DMD device makes synchronization easy since it is a digital device.

In a particularly preferred embodiment camera 24 uses binary CMOS detectors with adjustable reference levels. As the camera and projector are synchronized, it is known what frame is expected at which time. The beam is received at the camera, and the detected image is sent to processor 26.

The above-described CMOS technology enables us to easily sense at a rate of 1000 frames per second. Communicating the captured images with all of their gray levels to a processing unit at the kind of rate that a thousand frames a second might dictate, would be a very challenging task, yet, as described below with respect to FIG. 6, it is only in fact necessary to transmit binary information for each pixel per detection frame, that is to say only a single bit.

Considering the raw image in FIG. 4 each pixel in fact detects a gray level. However, it is possible to define a dynamic range over the object between the brightest and darkest pixels. Then one may set a threshold level which is exactly between the brightest and darkest levels. The individual pixels are thresholded and give a binary output depending on whether their detected signal is above or below the threshold. In this way the stripe pattern may be recovered. A preferred embodiment for setting the thresholds and then carrying out detection is explained below with respect to FIG. 8.

Figure 6:
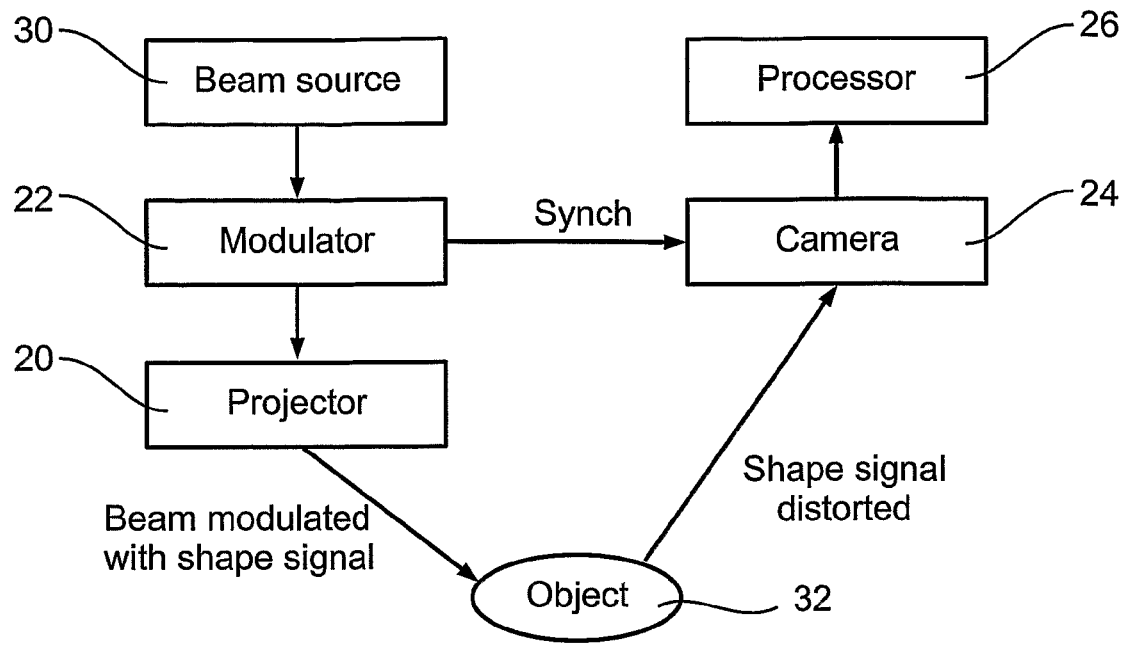
FIG. 6 is a schematic view of a second preferred embodiment of the present invention in which the detector is synchronized with the modulator.
Figure 7:
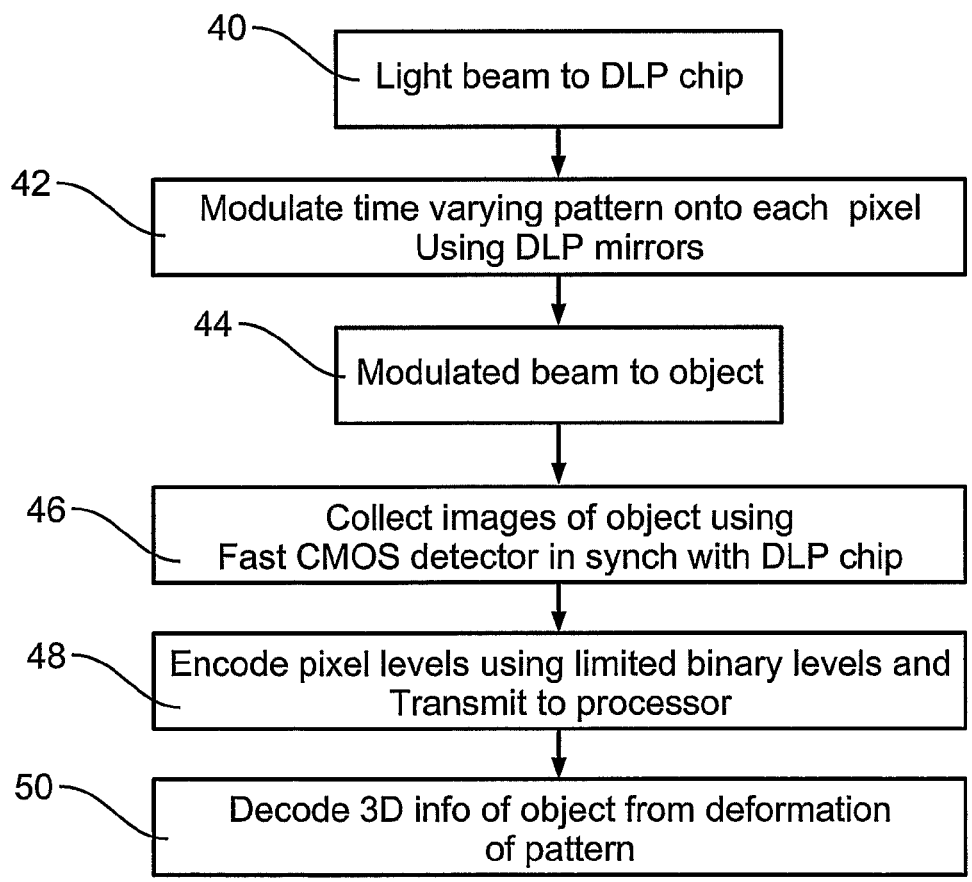
FIG. 7 is a simplified flow chart showing how the apparatus of FIG. 6 would detect a single frame assuming that the modulator has already been thresholded.

Operation of the device of FIG. 6 over a single frame is shown in the flow chart of FIG. 7. As explained, a beam is produced in stage 40. Using the digital micromirror device, an image is modulated onto the beam in stage 42 and then the beam is projected onto an object or scene in stage 44. The object distorts the image in accordance with the 3D contours of the object and the distorted image is detected at the fast CMOS detector or camera which is synchronized with the projector in stage 46. The image is then encoded as a binary level at each pixel in stage 48, the pixel having been thresholded at an earlier stage, which stage will be described in greater detail with reference to the FIG. 8 below. Finally in stage 50 the signal reaches the processor and then the distortion is used to recover the 3D contour of the object.

Figure 8:
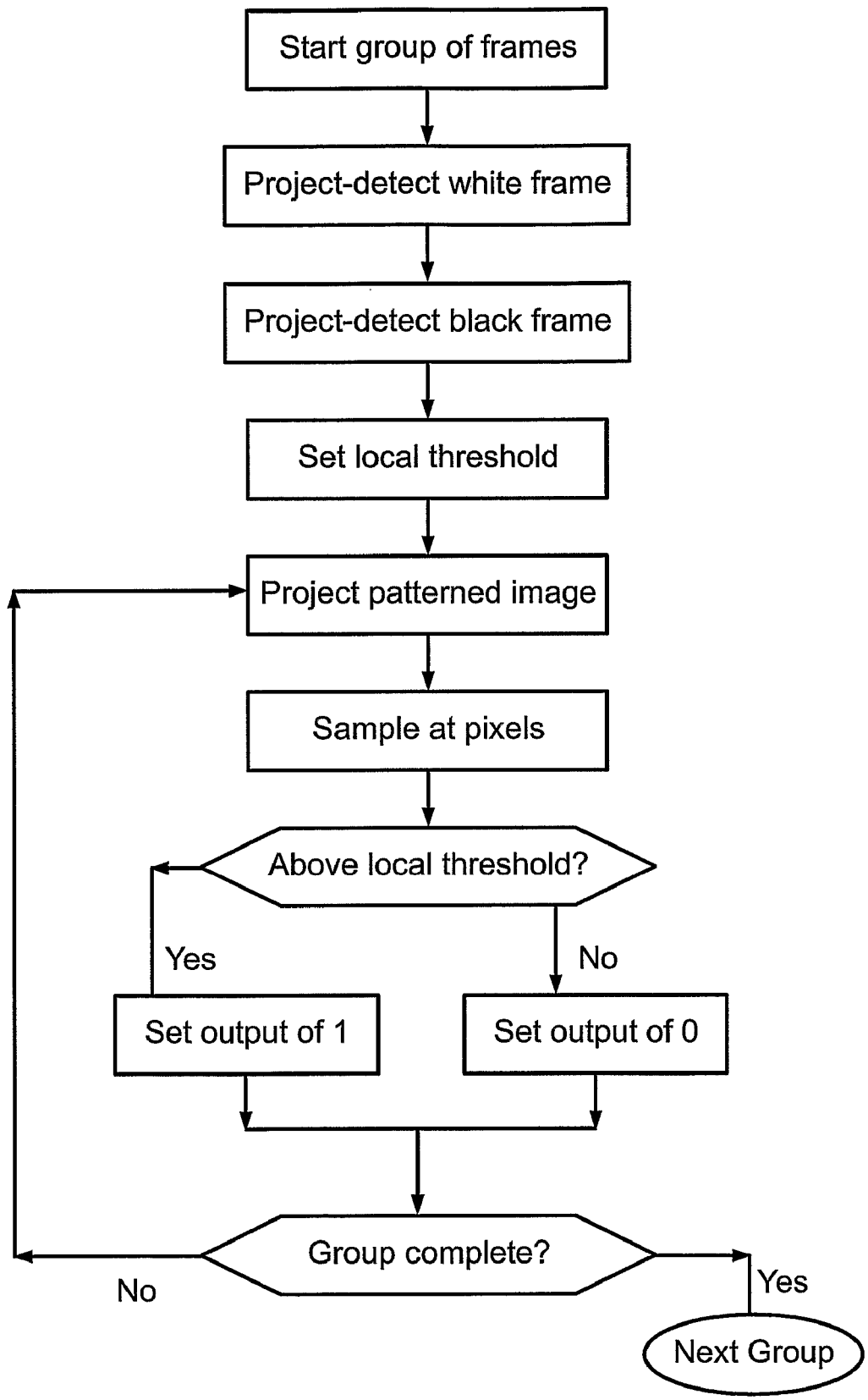
FIG. 8 is a simplified flow chart showing projection and detection of a group of frames including two thresholding frames at the start of the group, in accordance with the embodiment of FIG. 6.

Reference is now made to FIG. 8, which is a simplified diagram showing how each pixel can decode the striped signal using a single bit per frame.

A series of frames are grouped together. Using the projectors and detectors described herein a frame rate of a thousand frames per second can be achieved quite reasonably, so a group of ten frames say would cover a time period of a hundredth of a second.

The process begins with a calibration stage that allows a detection threshold to be calculated for the pixels in the detector. The calibration stage comprises projecting a first frame in the sequence or grouping, this first frame being entirely white, followed by a second frame that is entirely black. The two frames are detected and an average calculated. The black and white frames define the lower and upper values of a local dynamic range and the average defines a midpoint that can be used as a local threshold.

Once the calibration stage is over then a series of typically eight detection frames are projected. The detection frames involve structured light signals being modulated onto the beam. The structure is deformed at the object as explained and the deformations are detected at the detector. At each pixel, the detections are now thresholded using this threshold or local mid-range. Pixel detections lower than the threshold lead to one binary output and those above the threshold lead to the opposite binary output.

It is noted that a single threshold value for the entire object could be calculated or local values for sub-regions could be used instead. The process repeats itself every 10 patterns which is to say that the system is recalibrated every hundredth of a second. The process is thus very robust to changes in lighting etc.

Using the procedure outlined above, a sequence of 1000 projected patterns or frames per second can provide more than 100 groups×8 bits per group or layer, per second for a single pixel. Each such 8 bit layer represents a depth profile of the given pixel. There is thus provided depth map information in a way that can be obtained and transmitted in real time.

The preferred embodiments, therefore by coupling the DMD capability for time modulation of binary patterns, with a simple CMOS sensor with local synchronization and thresholding, provide real time 3D scanning.

The calculating of the local ranges and thresholds may be assigned to a dedicated preprocessor.

The preferred embodiment is therefore a combination of a Digital Micromirror Device (DMD), of the kind found at the heart of Digital Light Processing (DLP) systems, with existing CMOS optical sensor technologies in the form of digital CMOS cameras, and the result is a time modulated, coded light, 3D video sensor.

A prototype working at 0.7 frames per second has been built.

Projective Model of a Structured Light System

The following section teaches how shape encoded light, such as the striping discussed above can be used in stable manner to recover contour information of an object.

A typical structured light system consists of a camera and a projector. The role of the projector is to light the scanned object in such a way, that from the image (or sequence of images) acquired by the camera a stripe code can be extracted. The encoding can be done either spatially using a single pattern or temporally using a series of varying patterns The raw output of a structured light scanner is a stripe code assigned for every pixel in the image. Intersection of a ray in world coordinate system (WCS) with a plane in WCS yields the world coordinates of an object point. Using such a triangulation method, the raw sensor data is converted into 3D data in WCS.

In the following it is assumed that both the camera and the projector obey the pin-hole optical model. Non-linear distortion correction may be required for lenses that do not obey this model. The transformation from 3D world coordinates to camera image plane coordinates is commonly described by a 3×4 perspective projection matrix (PPM). We model the projector by a 2×4 PPM, mapping world coordinates to stripe identification code (id).

Let us define a homogenous world coordinate system Xw, in which the object position is specified; a homogenous camera coordinate system Xc, in which pixel locations in the image plane are specified, and a homogenous projector coordinate system Xp, in which stripe ids are specified. The latter is notable in that it contains only one independent coordinate.

The transformation from world coordinates to camera coordinates is given by $$Xc = CcXw; \quad (1)$$

where Cc is the camera PPM of the form $$C_c = a \begin{bmatrix} f_x & kf_y & x_c^0 \\ 0 & f_y & y_c^0 \\ 0 & 0 & 1 \end{bmatrix} [R_c \ t_c]. \quad (2)$$

The rotation matrix Rc and the translation vector tc define the transformation between WCS Xw and the camera-centric reference frame Xc. The parameters fx and fy are the camera focal length scaled to each of the CCD dimensions, and $x_c^0$ and $y_c^0$ are the origin of Xc in image coordinates. The parameter $\alpha$ is a proportion coefficient and k is the shear of the camera coordinate system.

Similarly, the transformation from world coordinates to projector coordinates is given by $$Xp=CpXw; \qquad (3)$$

where Cp is the projector PPM of the form $$C_c = \alpha \begin{bmatrix} f_p & 0 & x_p^0 \\ 0 & 0 & 1 \end{bmatrix} [R_p \quad t_p]. \qquad (4)$$

Rp and tp define the transformation between WCS and Xp. The parameter fp is the projector focal length scaled to LCD dimensions, and $x_p^0$ is the origin of Xp in projector coordinates, which physically is the x-coordinate of the intersection of the optical axis and the projector.

Here we implicitly assume that the stripe code varies along the horizontal direction of the projector. Cp is a valid camera PPM if the submatrix formed by its first three columns has full rank. Similarly, Pp is a valid projector PPM if the submatrix formed by its first three columns is of rank 2.

Equations 1 and 3 define the transformation $$T: Xw \rightarrow (Xc; Xp); \qquad (5)$$

which maps an object point in WCS into pixel location in the camera image plane and a stripe id (coordinate in the projector system of coordinates). We refer to this transformation as forward projection.

The world coordinates of the object point are usually unknown and have to be determined, whereas the pair (xc; xp) is what the structured light sensor measures and can be extracted from the raw data. Therefore, given the camera and the projector PPMs and a pair of measurements (xc; xp), one can attempt inverting 5 in order to calculate xw. We will term the inverse transformation $$T-1: (Xc; Xp) \rightarrow Xw; \qquad (6)$$

as backprojection and the process of determining world coordinates from measured data as reconstruction.

Reconstruction requires the knowledge of Cc and Cp. Therefore, calibration must be performed beforehand, during which the forward projection operator is estimated. This is done by measuring a set of pairs $\{(x_c, x_p)_n\}_{n=1}^N$ corresponding to a set of points with known world coordinates $\{(x_w)_n\}_{n=1}^N$ Physically, a calibration object with a set of fiducial points, whose location is known, is scanned. WCS is then chosen to be some local coordinate system of the calibration object, in which the coordinates of each fiducial point are specified.

Reconstruction

In this section we assume that the forward projection operator T is known (i.e. the projective matrices Cc and Cp are given). The reconstruction problem can be stated as follows: given measured (xc; xp), calculate xw according to $$xw = T-1(xc; xp): \qquad (7)$$

Explicitly, xw has to satisfy the linear system of equations $$xc = Ccxw \qquad (8)$$

$$xp = Cpxw: \qquad (9)$$

However, since all vectors are given in homogenous coordinates, it is possible that no xw satisfies equations 8 and 9 simultaneously. Let us denote xc=[wcxc; wcyc; wc]T and xp=[wpxp; wp]T and let ck, pk be the k-th row of Cc and Cp, respectively. Then, the linear system of equations can be rewritten as $$wcxc = c1xw$$

$$wcyc = c2xw$$

$$wc = c3xw \qquad (10)$$

and $$wpxp = p1xw$$

$$wp = p2xw: \qquad (11)$$

Substituting wc into 10 and wp into 11 yields $$xcc3xw = c1xw$$

$$ycc3xw = c2xw$$

$$xpp2xw = p1xw; \qquad (12)$$

which can be written in matrix notation as Qxw=0, where $$Q = \begin{bmatrix} x_c c_3 - c_1 \\ y_c c_3 - c_2 \\ x_p p_2 - p_1 \end{bmatrix}. \qquad (13)$$

The matrix Q can be split into a 3×3 matrix R and a 3×1 vector s: Q=[R; s]. Substituting $$xw = [w_w x_w; w_w y_w; w_w z_w; w_w]T \text{ yields}$$

$$[R, s] = \begin{bmatrix} w_w x_w \\ w_w x_y \\ w_w z_w \\ w_w \end{bmatrix} = R \begin{bmatrix} w_w x_w \\ w_w x_y \\ w_w z_w \end{bmatrix} + w_w s = 0. \qquad (14)$$

Therefore, the object point in non-homogenous world coordinates $$xw = [xw; yw; zw]T$$

is a solution of the linear system $$Rxw = -s: \qquad (15)$$

Backprojection is therefore given by $$xw = -R-1s: \qquad (16)$$

We bear in mind that both R and s are functions of xc, yc and xp.

If Cc and Cp are valid camera and projector PPMs, R is invertible except of cases where the ray originating from the camera focal point to the object point is parallel to the plane originating at the projector focal point and passing through the object point. The latter case is possible either when the object point is located at infinity, or when the camera and the projector optical axes are parallel (this happens when Rc=Rp). This gives a constraint on the camera and projector mutual location. In order to make triangulation possible, the camera should therefore not have its optical axis parallel to that of the projector.

Reconstruction Stability

We have seen that the matrix R in Equation 15 becomes singular when the ray in the camera coordinate system and the plane in the projector coordinates system are parallel. A reasonable question that may arise is how stable is the solution under random perturbations of xc and xp. Herein we will address only perturbations in xp, since they are the most problematic ones in structured light systems.

For simplicity, let us assume that WCS coincides with the camera coordinate system and the transformation to the projector coordinate system is given by $$xp = Rp + tp. \quad (17)$$

Without loss of generality, we assume that the center of the camera and projector coordinate system coincides with their optical axes, i.e. $x_c^0 = y_c^0 = x_p^0 = 0$.

Let us assume that the object point is found on some ray in $x = \alpha vc$; the ray is uniquely defined by the camera image plane coordinates xc and the point location is uniquely defined by the parameter $\alpha$. Let us denote by xp the stripe id corresponding to the given object point.

Then, the following system of linear equations $$nTxp = 0$$

$$nT(Rpxc + tp) = 0; \quad (18)$$

must hold simultaneously; n denotes the normal to the plane defined by the stripe id xp.

Substituting $xc = \alpha vc$ yields $$nTxp = nT(\alpha Rpvc + tp); \quad (19)$$

hence $$\alpha = \frac{n^T x_p}{n^T R_p v_c}. \quad (20)$$

However, in practice, the stripe id xp is estimated using structured light, and therefore it is especially sensitive to noise. Let us assume that instead of the real stripe id xp, a perturbed stripe id $\tilde{x}_p = x_p + \delta x_p$ was measured. This, in turn, means that: $\tilde{x}_p = x_p + [\delta x_p, 0, f_p]^T$, which yields $$\tilde{\alpha} = \frac{n^T x_p}{n^T R_p v_c}. \quad (21)$$

Hence, the perturbation in xp causes a perturbation in the location of the object point along the ray $xc = \alpha vc$ by $$\delta\alpha = \frac{n_1 \delta x_p}{\|n\|_2 \|v\|_2 \sin\Theta_{nv}}, \quad (22)$$

where $\Theta_{nv}$ is the angle between the plane defined by the normal n and the ray defined by the direction vc. Therefore, $$\delta\|x_w\|_2 = |\delta\alpha|\|v_c\|_2 = \left|\frac{n_1}{\|n\|_2 \sin\Theta_{nv}}\right| |\delta x_p|. \quad (23)$$

The ratio $\cos\theta_p = n_1/\|n\|_2$ has a geometrical interpretation of cosine of the projection angle. substituting it into Equation 23 yields the sensitivity of the reconstructed object point to perturbations in the stripe id:

$$\frac{\delta\|x_w\|_2}{|\delta x_p|} = \left|\frac{\cos\theta_p}{\sin\Theta_{nv}}\right| \quad (24)$$

Calibration

In this section we assume that the forward projection operator T is unknown and has to be estimated from a given set of measured $\{(x_c, x_p)_n\}_{n=1}^N$ and corresponding known $\{x_w\}_{n=1}^N$.

Explicitly, it is desired to find such Cc and Cp that obey $$(xc)_k = C_c(xw)_k \quad (25)$$

$$(xp)_k = C_p(xw)_k; \quad (26)$$

for k=1; ..., N. Since data measurement is not perfect (e.g., both the camera and the projector resolution is finite), no projection operator will fit the data perfectly. Our goal is therefore to find such a T−1 that will relate the measured and the known data in an optimal way. It is thus important to address the optimality criterion.

It is possible to separately optimize the camera and projector forward projections in the sense of the L2 norm. Mathematically, this can be formulated as $$C_c = \operatorname{argmin} \sum_{k=1}^N \|C_c(x_w)_k - (x_c)_k\|_2^2 \; s.t. \; C_c \in PPM \quad (27)$$

$$C_p = \operatorname{argmin} \sum_{k=1}^N \|C_p(x_w)_k - (x_p)_k\|_2^2 \; s.t. \; C_p \in PPM.$$

Let us define $$B_k = \begin{bmatrix} (x_w)_k & 0 \\ 0 & (x_w)_k \\ -(x_c)_k (x_w)_k & -(y_c)_k (x_w)_k \end{bmatrix}^T \quad (28)$$

$$l = [c_1, c_2, c_3]^T,$$

where ck is the k-th row of Cc. Using this notation, the set of N equations 25 can be rewritten as $$B_k l = 0; \quad (29)$$

for k=1; ... ; N, which in turn can be expressed as a single homogenous linear equation $$Al = 0; \quad (30)$$

where $A = [B_1^T, \ldots, B_N^T]^T$. The vector of variables l is the camera projection matrix Cc that needs be determined. Since the camera PPM is defined up to a scaling factor, we may demand $\|l\|_2 = 1$ in order to avoid the trivial solution. With physically measured data, the matrix A will usually have full rank and therefore, no l will be an exact solution of equation 30. However, one can find the best least-squares solution by solving $$l = \operatorname{argmin} \|Al\|_2^2 \, s.t. \|l\|_2 = 1, \quad (31)$$

and ensuring that the obtained Cc is a valid PPM. Solving equation 31 is equivalent to solving equation 27 for the camera matrix, and its solution minimizes the square error between the measured image plane coordinates of the set of fiducial points and those obtained by projecting the set of the corresponding points in WCS onto the camera image plane.

Similarly, replacing Bk and l in equation 28 with $$B_k = \begin{bmatrix} (x_w)_k \\ -(x_p)_k (x_w)_k \end{bmatrix}^T \quad (32)$$

$$l = [p_1, p_2]^T$$

yields the L2 minimization problem of equation 27 for the projector matrix.

Optimization problem equation 31 is a minimum eigenvalue problem and it can be shown that l minimizing $\|Al\|_2$ is the eigenvector corresponding to the minimum eigenvalue of $A^T A$. It must be noted, however, that since usually the minimum eigenvalue of $A^T A$ is very small, numerical inaccuracies are liable to rise.

Solution to the problem in 27 finds two PPMs that minimize the squared error between the measured data and the forward projection of the known fiducial points in WCS into the camera and the plane coordinate systems. However, what is actually needed is to minimize the squared error between the known fiducial points in WCS and the backward-projected measurements. Mathematically, this can be formulated as $$T = \operatorname{argmin} \sum_{k=1}^{N} \|T^{-1}(x_c, x_p)_k - (x_w)_k\|_2^2 \ s.t. \ C_c, C_p \in \text{text } PPM. \quad (33)$$

The above problem is no more separable and is non-convex; therefore, it is preferably solved by numerical global optimization methods. Nevertheless, an efficient solution in just a few iterations is possible using the Newton method, since the number of variables in the problem is small and both the cost function, its gradient, and the Hessian can be computed analytically. As the starting point for iterative optimization, a solution of problem 27 can be used.

As the calibration process is performed once, it is preferred to invest additional computational complexity in order to obtain better projection estimation and better reconstruction results.

It is expected that during the life of this patent many relevant scanning, modulating, projection and light detection devices and systems will be developed and the scope of the corresponding terms herein, is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A 3D scanning device comprising:
   a digital light encoding unit comprising a digital micromirror device for encoding a succession of structural light signals onto a light beam directed to an object, a structure of said signal being selected such that distortions thereof by a contoured object reveal three-dimensional information of said contour;
   a detector synchronized with said digital light processing unit for detecting reflections of said light beam from said object; and
   a decoder for determining a 3D shape of said object from distortions of said signal in said detected reflections:
   wherein for each structural light signal, said detector is configured to pass a single bit of data to said decoder per pixel of the detected image.

2. The 3D scanning device of claim 1, wherein said structural light signals comprise binary pattern elements.

3. The 3D scanning device of claim 2, wherein said detector comprises a plurality of sensor pixels, and each sensor pixel is configured to output a binary signal indicating said detected reflections.

4. The 3D scanning device of claim 2, wherein said succession of structural light signals defines a sequence of time frames.

5. The 3D scanning device of claim 4, wherein said detector comprises a plurality of sensor pixels, and each sensor pixel is configured to output a single bit per time frame indicating said detected reflections.

6. The 3D scanning device of claim 1, further comprising a preprocessor for thresholding and encoding data received at said detector.

7. A method of real time three-dimensional scanning of an object, comprising:
   directing a light beam at said object via a digital micromirror device;
   operating said digital micromirror device to modulate a rapidly changing structural light signal onto said beam;
   detecting a reflection of said beam at a detector synchronized with said beam;
   passing a single bit of data to a decoder for each pixel of said reflection; and
   decoding said reflection to determine depth information of said object.

8. The method of claim 7, wherein said rapidly changing structural light signal comprises a binary pattern element.

9. The method of claim 8, wherein said detector comprises a plurality of sensing pixels, and each pixel sends a binary signal for said decoding.

10. The method of claim 8, wherein said rapidly changing structural light signal defines time frames, wherein said detector comprises a plurality of sensing pixels and each pixel sends a single bit per time frame for said decoding.

11. A 3D scanning device comprising:
   a beam source for producing a light beam for projection towards an object;
   a digital light binary signal encoding unit connected downstream of said beam source, for modulating a rapidly changing structural light signal onto said light beam, said signal comprising a structure selected for distortion by a three-dimensional contour;

a detector comprising sensor pixels, synchronized with said digital light binary signal encoding unit, for detecting reflections of said light beam from said object at said sensing pixels as binary data; and a binary decoder for determining a 3D shape of said object from distortions of said time signal in said detected reflections.

12. The 3D scanning device of claim 11, further comprising a preprocessor associated with said detector for thresholding and encoding data of said detected reflections at said sensing pixels, thereby to recover said binary data.

13. The 3D scanning device of claim 11, wherein said digital light binary signal encoding unit comprises a digital micromirror device to modulate said binary data onto said signal.

14. A method of real time three-dimensional scanning of an object, comprising:

directing a light beam at said object;

modulating a rapidly changing shape signal onto said beam, said shape signal comprising a shape selected such that distortion thereof is indicative of a three-dimensional contour of said object;

synchronously detecting a reflection of said beam at a detector synchronized with said modulating of said beam;

passing binary signals from said detector to a decoder; and decoding, using said decoder, said binary signals to extract distortion information of said shape signal, therefrom to determine information pertaining to said three-dimensional contour of said object.

15. A method of real time three-dimensional scanning of an object, comprising:

directing a light beam at said object;

modulating a light frame and a dark frame onto said light beam in successive frames prior to reaching said object;

detecting, using a detector, reflections of said successive frames from said object to obtain a light frame detection level and a dark frame detection level;

calculating a mid level between said light frame detection level and said dark frame level;

setting said mid level as a detection threshold at said detector;

modulating a plurality of structural light signals onto said beam in further successive frames;

detecting said successive frames at said detector using said detection threshold, thereby to provide binary detection of said structured light signal; and determining a three-dimensional structure of said object from detected distortions in said structured light signals.

16. The method of claim 15, wherein said detecting by the detector is synchronized with said modulating.

17. The method of claim 15, wherein said modulating is carried out using a digital micromirror device.

* * * * *